(12) United States Patent
Matthiesen

(10) Patent No.: US 9,400,059 B2
(45) Date of Patent: Jul. 26, 2016

(54) TUBE CONSTRICTION VALVE

(75) Inventor: Rolf Matthiesen, Goettingen (DE)

(73) Assignee: SARTORIUS STEDIM BIOTECH GMBH, Goettingen (DE)

(*) Notice: Subject to any disclaimer, the term of this patent is extended or adjusted under 35 U.S.C. 154(b) by 0 days.

(21) Appl. No.: 13/575,035

(22) PCT Filed: Jan. 27, 2011

(86) PCT No.: PCT/EP2011/000368
§ 371 (c)(1),
(2), (4) Date: Jul. 25, 2012

(87) PCT Pub. No.: WO2011/095299
PCT Pub. Date: Aug. 11, 2011

(65) Prior Publication Data
US 2012/0298891 A1    Nov. 29, 2012

(30) Foreign Application Priority Data
Feb. 5, 2010 (DE) .......................... 10 2010 007 018

(51) Int. Cl.
F16K 7/06 (2006.01)
F16K 37/00 (2006.01)

(52) U.S. Cl.
CPC .............. *F16K 7/061* (2013.01); *F16K 37/0041* (2013.01); *Y10T 137/8242* (2015.04)

(58) Field of Classification Search
CPC ................ F16K 7/061; F16K 37/0041; Y10T 137/8275; Y10T 137/8242
USPC .................................... 251/4, 8; 137/524, 556
See application file for complete search history.

(56) References Cited

U.S. PATENT DOCUMENTS

| | | | |
|---|---|---|---|
| 2,574,603 A * | 11/1951 | Uhlig ........................ | 192/142 A |
| 3,111,847 A * | 11/1963 | Kooiman et al. ............... | 73/386 |
| 3,231,182 A * | 1/1966 | Downey ............................. | 494/1 |
| 3,285,563 A * | 11/1966 | Clarkson ........................... | 251/8 |
| 3,332,439 A * | 7/1967 | Burke ............................... | 137/556 |
| 3,826,461 A * | 7/1974 | Summerfield et al. ........... | 251/7 |
| 5,197,708 A | 3/1993 | Campau | |
| 5,445,613 A | 8/1995 | Orth | |
| 6,012,342 A * | 1/2000 | Blight et al. ............. | 73/862.621 |
| 2004/0200985 A1* | 10/2004 | Lipscomb et al. ................ | 251/8 |
| 2010/0025524 A1* | 2/2010 | Doversberger ............ | 244/17.13 |
| 2012/0018654 A1* | 1/2012 | Wennberg et al. ................ | 251/9 |

FOREIGN PATENT DOCUMENTS

DE    10 2007 002 765    4/2008
WO              99/33514    7/1999

* cited by examiner

*Primary Examiner* — Marina Tietjen
*Assistant Examiner* — Daphne M Barry
(74) *Attorney, Agent, or Firm* — Gerald E. Hespos; Michael J. Porco; Matthew T. Hespos

(57) ABSTRACT

A tube constriction valve has a valve body (1) with an approximation sensor (3) and a clamping bolt (2) that squeezes the tube inside the valve body (1). The approximation sensor (3) detects the position of the tube constriction valve and can indicate corresponding data by an approximation element (4) on the clamping bolt (2). The tube constriction valve allows for automatic and also manual operation and at the same time contains a position indicator. Consequently, damage to the tube is prevented and processing reliability preserved.

11 Claims, 2 Drawing Sheets

TUBE CONSTRICTION VALVE

BACKGROUND OF THE INVENTION

1. Field of the Invention

The invention relates to a manual tube constriction valve with a position indicator. A valve of this type can be used in particular for single-use tubes, for example in the foodstuffs and beverage industry, biotechnology, the chemical industry or the pharmaceutical industry.

2. Description of the Related Art

Tube constriction valves are known in many different variants. Disposable tubes are used increasingly for tube lines in the area of laboratory technology, the foodstuffs and beverage industry, the chemical industry, biotechnology or pharmaceutical product research or manufacture in order to save on cleaning costs or also to guarantee sterility. A valve which is easy to handle and operates in a reliable manner is necessary for these types of tubes.

AT 376 025 B makes known a tube constriction valve which, by means of an electromagnetically actuatable clamping bolt, closes the tube which is situated in a longitudinal groove. A disadvantage in this case is that it is not precisely visible when the tube flow is blocked. Consequently, it is necessary to squeeze the tube very strongly, which can lead to damage to the tube or even to the valve or where the closing is incomplete results in a lack of reliability in the processing sequence.

DE 10 2007 002 765 B3 makes known a constriction valve which has electrically actuatable positional detecting means, as a result of which the operating position of impinging means can be detected. In this connection, it has proven disadvantageous that said valve is not suitable for disposable tubes or single-use systems. The tube which is squeezed for closing is incorporated into the valve and can only be changed within the framework of maintenance work. Consequently, the valve is product-based and not suitable for single-use on account of the high costs. In addition, said constriction valve is designed in a complicated manner and consists of many elements.

Consequently, the object underlying the invention is to develop a tube constriction valve with an approximation sensor which is simple to handle and at the same time guarantees a high level of processing reliability.

SUMMARY OF THE INVENTION

A tube constriction valve according to the invention essentially has two parts. On the one hand, a valve body which includes an approximation sensor and on the other hand at least one movable clamping bolt which has at least one approximation element. The valve body has a tube guide into which a tube can be inserted or pushed. The clamping bolt reaches the tube through an opening in the valve body and closes said tube by means of squeezing. An approximation sensor situated on the valve body documents the distance of the approximation element. If the distance between the disk and the sensor corresponds to its control flank, a signal is triggered and the position indicated. Consequently, a reduced flow can be controlled just as a controlled closure which closes the tube completely but does not damage it.

According to a preferred embodiment of the invention, the clamping bolt is manually actuatable. Through the positional indication of the tube constriction valve, a manually actuated closure or opening is possible without any problem and in a reliable manner.

A further possibility is to support the manual actuation by means of mechanical or electric devices. By means of a light diode on the sensor, an optical signal can be output in addition in order, for example, to indicate a closure or opening.

According to a further preferred embodiment of the invention, the clamping bolt is movable by means of hydraulics or pneumatics.

According to a further particularly preferred embodiment of the invention, the clamping bolt of the tube constriction valve has a thread and the valve body has a counter thread matching thereto. By rotating the clamping bolt, said clamping bolt is consequently movable in or in opposition to the direction of the tube and the approximation element is moved in or in opposition to the direction of the approximation sensor.

In a further advantageous development of the invention, the approximation element is a planar metal disk. The rest of the tube constriction valve can be from one or different arbitrary materials.

The metal disk is necessary in the case of a further particularly advantageous embodiment of the invention, where the approximation sensor operates in a magnetically inductive manner. Said principle is suitable in a reliable manner for documenting the status.

According to a further preferred embodiment of the invention, at least one fastening element is mounted on the valve body. Possible in this connection, for example, are bore(s) with thread or locking element(s), one or several clamping closures, one or several projections with thread(s) etc. Consequently, the valve body can be fixedly mounted at a position and does not hang loosely on the tube. The tube constriction valve according to the invention can be operated one-handed and does not have to be stored intermediately when a tube is changed. In addition, the tube constriction valve consequently provides a guide for the arrangement of the tube lines.

According to a further particularly preferred embodiment of the invention, the approximation element is adjustable, for example by means of locknuts, which hold the approximation element fixedly in one position, by means of which, however, an arbitrary distance from the sensor is adjustable. The precise position of the approximation elements depends on the diameter and material of the hose and is determined during assembly. The approximation element can be fixed such that at the moment of the complete closing it is at a spacing from the approximation sensor at which said approximation sensor outputs a signal. The locknut facing the valve body, or an additional nut, also provides a mechanical stop for the shaft, as a result of which over-turning the clamping bolt can be prevented. This means that the tube is protected from damage or destruction. This increases the processing and operating reliability. Other fastening devices are also possible in place of (lock) nuts and/or where threads are not used.

According to a preferred use of the invention, the tube constriction valve is provided for controlling the inner cross section of a tube.

According to a particularly preferred use of the invention, the tube is closed by the tube constriction valve.

According to a further preferred embodiment of the invention, the approximation element is mounted on the valve body and the approximation sensor is mounted on the clamping bolt.

DETAILED DESCRIPTION OF THE PREFERRED EMBODIMENTS

Figure 1:
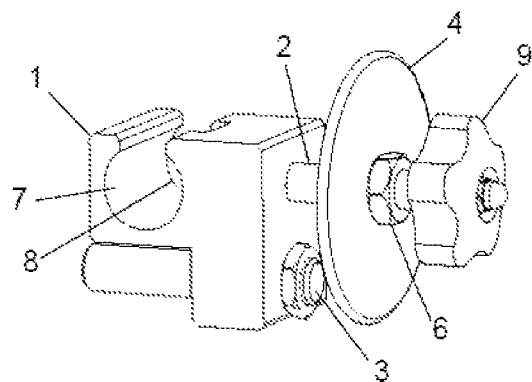
FIG. 1 shows a three-dimensional representation of a tube constriction valve with a valve body and a clamping bolt.
Figure 2:
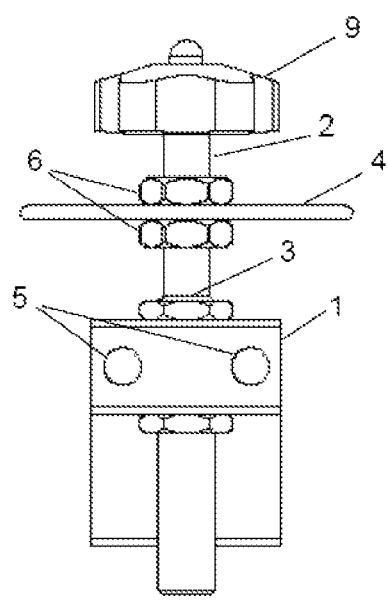
FIG. 2 shows a side view of a tube constriction valve with a valve body and a clamping bolt.

According to FIG. 1 and FIG. 2, a tube constriction valve consists of a valve body 1 and a clamping bolt 2. The clamping bolt 2 plugs in the valve body 1. An approximation element 4 located on the clamping bolt 2 allows the approximation sensor 3 to document the position of the clamping bolt 3 and provides an indication in this respect. By means of locknuts 6 or also other fastening devices, the approximation element 4 is adjustable to different tube wall thicknesses and tube sizes in order to ensure complete and damage-free closure.

FIG. 1 shows a perspective exemplary embodiment of the tube constriction valve with a substantially circular tube guide 7 in the valve body 1, into which a tube can be inserted. The tube is constricted during closure by means of a hemisphere 8 located on the side of the clamping bolt 2 facing the tube end and is held afterwards itself by its extension. A handle 9 located at the other end simplifies manual adjustment of the tube constriction valve. By designing the approximation element 4 as a substantially planar disk, a reliable status indication during rotation as well as during displacement of the clamping bolt 2 is possible.

FIG. 2 shows a side view of an exemplary embodiment of the tube constriction valve. In a configuration with thread, the clamping bolt 2 can be screwed in and out by means of the handle 9, which can be realized, for example, as a hand wheel. At a certain distance between the approximation element 4 and the approximation sensor 3, the approximation sensor 3 outputs a signal which is forwarded to a system control means. In addition, a light diode on the approximation sensor 3 can output an optical signal. The locknut 6 facing the valve body 1 can additionally stop the closing process and is consequently a redundant means for maintaining the integrity of the tube, as over-constriction is able to be prevented. By means of fastening elements 5, such as, for example, threaded holes or threaded projections, the valve body 1 can be mounted or screw-connected in a fixed manner. As a result, the media flow can be controlled in a very comfortable and reliable manner using the tube constriction valve. In addition, the tube constriction valve cannot be lost when tubes are changed. As an additional function, in this way the tube constriction valve also provides a guide for an arrangement of tube lines.

In single-use systems, the tubes are not part of a tube constriction valve, but are disposed of after every charge. Only the valve remains behind and is provided with a new tube for the next charge. Fastening elements 5 are consequently a useful aid for such systems.

Figure 3:
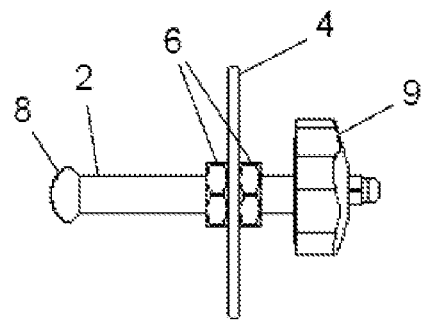
FIG. 3 shows a side view of a clamping bolt for a tube constriction valve.

FIG. 3 shows a side view of an exemplary embodiment of a clamping bolt 2 for a tube constriction valve. Manual adjustment is simplified by the handle 9. By means of the semicircular development of the semi sphere 8, reliable constricting and consequently closing of a tube is possible. Locknuts 6 hold the approximation element 4 in position on the one side and offer constriction protection for the tube on the other side by providing a stop and consequently a mechanical boundary for the clamping bolt 2.

Figure 4:
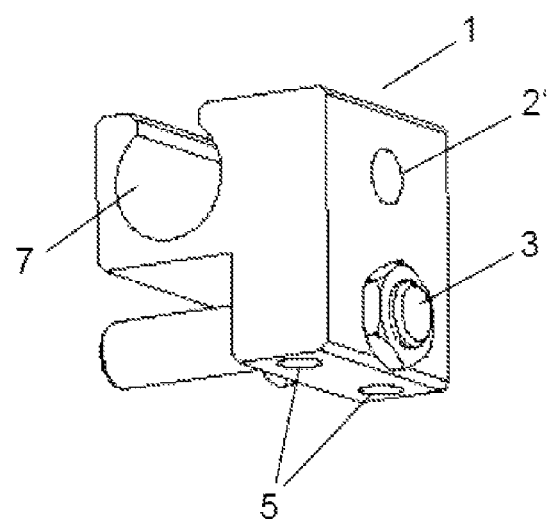
FIG. 4 shows a three-dimensional representation of a valve body for a tube constriction valve.

FIG. 4 shows a three-dimensional representation of an exemplary embodiment of a valve body 1 for a tube constriction valve. The clamping bolt guide 2' is shown in this connection. This can be realized, for example, as a counter thread. The fastening elements 5 are realized as threaded bores. A hollow cylindrical tube guide 7 counters the expansion characteristics of the tube with a semi sphere 8 during constriction. A complete closure of the tube can consequently be ensured and can be documented by the approximation sensor 3.

The invention claimed is:

1. A tube constriction valve comprising a valve body (1) with first and second opposite ends spaced apart in an axial direction and a tube guide extending through the valve body from the first end to the second end, at least one clamping bolt (2) mounted into an external surface of the valve body (1) between the first and second ends, the clamping bolt (2) being configured for movement transverse to the axial direction, so that an end of the clamping bolt (2) is selectively movable into the tube guide (7), at least one disk (4) adjustably mounted on the clamping bolt (2) external of the valve body (1) and fixable at selected positions along the clamping bolt (2) facing the external surface into which the clamping bolt (2) is mounted and an approximation sensor (3) mounted to the external surface of the valve body (1) into which the clamping bolt (2) is mounted and at a position so that a radial distance from the clamping bolt (2) to the approximation sensor (3) is less than a radial distance from the clamping bolt (2) to an outer periphery of the disk (4) and so that the approximation sensor (3) is facing the disk (4) along a moving direction of the clamping bolt (2), the approximation sensor being operative for measuring a distance between the approximation sensor (3) and the disk (4) at all rotational positions of the clamping bolt (2) relative to the valve body (1), the distance defining a position of the end of the clamping bolt (2) in the tube guide (7) of the valve body (1) based on a relative position of the disk (4) on the clamping bolt (2) and the distance between the approximation sensor (3) and the disk (4).

2. The tube constriction valve of claim 1, wherein the clamping bolt (2) is manually actuatable.

3. The tube constriction valve of claim 1, wherein the clamping bolt (2) is movable by hydraulics or pneumatics.

4. The tube constriction valve of claim 1, wherein the clamping bolt (2) has a thread and the valve body (12) has a clamping bolt guide (2') threadedly engaged with the clamping bolt (2).

5. The tube constriction valve of claim 1, wherein at least one bore (5) is formed in the valve body (1) and extending transverse to the axial direction, the at least one bore (5) being configured for fixedly mounting the valve body at a specified position so that the valve body (1) does not hang loosely on the tube.

6. The tube constriction valve of claim 1, wherein the disk (4) is adjustable by means of locknuts (6) on a thread of the clamping bolt (2).

7. The tube constriction valve of claim 1, wherein the valve body (1) includes a tube insertion slot extending from the first end to the second end and opening into the tube guide to permit insertion of a tube into the tube guide in a direction transverse to the axial direction.

8. The tube constriction valve of claim 1, wherein the disk (4) is a metal disk.

9. The tube constriction valve of claim 8, wherein the approximation sensor (3) operates in a magnetically inductive manner.

10. The tube constriction valve of claim 9, further comprising a system controller connected to the approximation sensor (3) and configured to generate a signal at a specified distance between the disk (4) and the approximation sensor (3).

11. The tube constriction valve of claim 8, wherein the approximation sensor (3) includes a light diode that outputs an optical signal at a specified distance between the disk (4) and the approximation sensor (3).

* * * * *